(12) United States Patent
Pietraszek et al.

(10) Patent No.: US 8,201,259 B2
(45) Date of Patent: Jun. 12, 2012

(54) METHOD FOR EVALUATING AND ACCESSING A NETWORK ADDRESS

(75) Inventors: Tadeusz Pietraszek, Rueschlikon (CH); Chris Vanden Berghe, Hong Kong (CN)

(73) Assignee: International Business Machines Corporation, Armonk, NY (US)

( * ) Notice: Subject to any disclaimer, the term of this patent is extended or adjusted under 35 U.S.C. 154(b) by 773 days.

(21) Appl. No.: 12/158,773

(22) PCT Filed: Dec. 13, 2006

(86) PCT No.: PCT/IB2006/054801
§ 371 (c)(1),
(2), (4) Date: Oct. 30, 2008

(87) PCT Pub. No.: WO2007/072320
PCT Pub. Date: Jun. 28, 2007

(65) Prior Publication Data
US 2009/0094677 A1   Apr. 9, 2009

(30) Foreign Application Priority Data
Dec. 23, 2005  (EP) .................................. 05112935

(51) Int. Cl.
*G06F 7/04* (2006.01)
(52) U.S. Cl. ............. 726/26; 726/30; 713/152; 713/168
(58) Field of Classification Search ............... 726/26, 726/30; 713/152, 168
See application file for complete search history.

(56) References Cited

U.S. PATENT DOCUMENTS

| | | | |
|---|---|---|---|
| 5,892,919 A * | 4/1999 | Nielsen | 709/228 |
| 7,130,923 B2 * | 10/2006 | Mason | 709/245 |
| 7,376,752 B1 * | 5/2008 | Chudnovsky et al. | 709/245 |
| 7,502,923 B2 * | 3/2009 | Poyhonen et al. | 713/153 |
| 7,653,812 B2 * | 1/2010 | Levin et al. | 713/168 |
| 7,698,442 B1 * | 4/2010 | Krishnamurthy et al. | 709/229 |
| 2004/0078422 A1 * | 4/2004 | Toomey | 709/202 |
| 2004/0123157 A1 * | 6/2004 | Alagna et al. | 713/201 |

(Continued)

FOREIGN PATENT DOCUMENTS
WO   WO2005/091107   9/2005
(Continued)

OTHER PUBLICATIONS

Liu Wenyin et al, "Phishing Webpage Detection" [online], Proceedings 8th International Conference on Document Analysis and Recognition, IEEE, Piscataway, NY, USA, Aug. 31, 2005 [Retrieved on: Apr. 20, 2011], pp. 560-564 [Retrieved from: http://www.americol.com/pace/DPS2009/spring2007/dcs823/IDTHEFT/phishing/ieee/24200560.pdf].*

(Continued)

*Primary Examiner* — Philip Chea
*Assistant Examiner* — Eric W Shepperd
(74) *Attorney, Agent, or Firm* — William Stock; Anne Vachon Dougherty

(57) ABSTRACT

The invention relates to a method for evaluating or accessing a network address, comprising the steps of: receiving a network address (50); generating derivatives (60) of the received network address (50); assigning a trust level to the generated derivatives (60) and the received network address (50); comparing the trust levels of the derivatives (60) with the trust level of the received network address (50); and issuing a response based on the comparison.

19 Claims, 3 Drawing Sheets

U.S. PATENT DOCUMENTS

| | | | |
|---|---|---|---|
| 2005/0192987 A1* | 9/2005 | Marsh | 707/100 |
| 2006/0123478 A1* | 6/2006 | Rehfuss et al. | 726/22 |
| 2006/0168066 A1* | 7/2006 | Helsper et al. | 709/206 |
| 2006/0277591 A1* | 12/2006 | Arnold et al. | 726/1 |
| 2007/0136806 A1* | 6/2007 | Berman | 726/22 |
| 2007/0294352 A1* | 12/2007 | Shraim et al. | 709/206 |

FOREIGN PATENT DOCUMENTS

WO  WO 2005091107 A1 *  9/2005

OTHER PUBLICATIONS

Ali, Ali Shaikh et al, "A Cognitive Trust-Based Approach for Web Service Discovery and Selection" [online], Proceedings of Third European Conference on Web Services, IEEE, Vaxjo, Sweden, Nov. 14-16, 2005 [Retrieved on May 20, 2011] [Retrieved from: http://ieeexplore.ieee.org/stamp/stamp.jsp?tp=&arnumber=1595715].*

U.S. Appl. No. 12/158,773—Security Pipeline, "How to Protect Yourself Against Domain Name Hijackers", CMP Technology and Dark Reading [Online], Aug. 2005 [Retrieved on Jan. 23, 2012] [Retrieved from: http://securityskeptic.typepad.com/the-security-skeptic/how-to-protect-yourself-agai nst-domain-name-hijackers-. html ].*

Liu Wenyin et al, "Phishing Webpage Detection", Proceedings 8th International Conference on Document Analysis and Recognition, IEEE, Piscataway, NY, USA, Aug. 31, 2005, pp. 560-564.

* cited by examiner

METHOD FOR EVALUATING AND ACCESSING A NETWORK ADDRESS

TECHNICAL FIELD

The present invention is related to a method, a computer program and a computer system for evaluating and accessing a network address. Furthermore, the invention is related to a method for deploying computing infrastructure and a method for performing an analysis of the network communication traffic of a business entity. A network address can be any address that is suitable for locating a resource in a network.

BACKGROUND OF THE INVENTION

The Internet and other networks have changed the way people do business by providing instant global presence to businesses. At the same time the Internet has also given rise to new forms of criminality, which benefit from the Internet in much the same way as regular businesses do. One of the most common forms of Internet fraud is "phishing", a social engineering attack in which an attacker tricks the user into disclosing sensitive information, such as credit card information, account numbers, account names, passwords, etc. Phishing attacks pose a serious threat to e-commerce.

One common type of phishing attack consists of three parts:
- a message that urges the user to visit an attacker-controlled website,
- a Uniform Resource Locator (URL) that looks similar to a trusted one, and
- a website that imitates the layout of the trusted website.

The message will typically be an unsolicited email containing a fictive story urging the user to disclose sensitive information, e.g. to validate its bank account or credit card information. This message contains a link that appears trustworthy, i.e., appears to point to a trustworthy website, but will in fact point to an attacker-controlled website.

Techniques commonly used in obfuscating URLs include:
- a combination of Javascript and Hyper Text Markup Language (HTML),
- obfuscated URL syntax (e.g. http://user:password@host/webpage an address such as user:password at a host/webpage),
- URL rendering errors (e.g. invalid x00 rendering),
- international domain names (IDN) containing similar or even identical looking characters (e.g., Russian's "a" instead of a standard (Latin) 'a'), and
- similar Domain Name System (DNS) names (e.g. mybank-online or my6ank.com or mybank.co.uk instead of mybank.com Another type of phishing-attack is to run a website with an URL that deviates from the URL of a trusted website only by a common typing error.

In the attacker-controlled website, the attacker effectively impersonates a bank or other institutions and tricks the victim into disclosing sensitive information.

A known method to prevent phishing attacks is to use blacklists created from user reports and identified phishing e-mails.

The disadvantage of this method is that it is only effective against known phishing attacks.

Another known method to prevent phishing attacks is to display additional information about a website, e.g. its hosting location, since when it has been registered and a rank of a page.

The disadvantage of such a method is that they may overwhelm the user with the amount of information and may cause false positives with less popular websites.

The last group of known methods to prevent phishing attacks is based on e-mail filtering using e.g. Bayesian filters which filter suspicious e-mail messages or reformat them in a way that discloses their malicious intent. The disadvantage of such techniques is that they are only effective against phishing that is disseminated by using e-mails.

It is an object of the invention to provide improved solutions for internet and network security.

SUMMARY AND ADVANTAGES OF THE INVENTION

The present invention is directed to methods, a computer program and a computer system as defined in independent claims. Further embodiments of the invention are provided in the appended dependent claims.

According to one aspect of the present invention, there is presented a method for evaluating a network address, comprising the steps of:
- receiving a network address;
- generating derivatives of the received network address;
- assigning a trust level to the generated derivatives and the received network address;
- comparing the trust levels of the derivatives with the trust level of the received network address; and
- issuing a response based on the comparison.

This method allows the evaluation of the trustworthiness of network addresses in an efficient, reliable and flexible way. The method can detect untrustworthy network addresses automatically, i.e. independent from any user interaction. Furthermore, it allows the automatic detection of untrustworthy network addresses which are not known for being untrustworthy yet.

According to another aspect of the present invention, there is presented a method for accessing a network address, comprising the steps of:
- requesting a network address,
- generating derivatives of the requested network address,
- assigning a trust level to the generated derivatives and the requested network address,
- comparing the trust levels of the derivatives with the trust level of the requested network address and
- issuing a response based on the comparison.

This method allows a secure accessing of network addresses in an efficient, reliable and flexible way. The method can detect automatically that a requested network address is not trustworthy and provide appropriate countermeasures. Furthermore, it allows the automatic detection of untrustworthy network addresses which are not known for being untrustworthy yet.

According to an embodiment of the invention the received, accessed or requested network address is the address of a web site or web page respectively. The application of the method according to this aspect of the invention for evaluation of the trustworthiness of webpages can enhance the internet security significantly. In particular it is an efficient and reliable method against phishing attacks.

According to a further embodiment of the invention the received, accessed or requested network address is a Uniform Resource Identifier (URI), in particular a Uniform Resource Locator (URL). URIs and URLs are standardized elements for addressing resources in the Internet.

The generated derivatives should be in some way similar to the network address that has been received or accessed and is targeted for evaluation. The similarity can be e.g. optical, structural or editorial.

According to an embodiment of the invention, the derivatives are generated by means of at least two different methods. This further improves the security and reliability of the method. The more methods used, the more derivatives can be generated.

According to a further embodiment of the invention derivatives which are optically similar to the received network address are generated by means of Optical Character Recognition (OCR).

OCR can be performed by several well established methods which analyze and recognize the characters of a scanned text. By applying these methods and/or adapted methods on the received network address, one or more network addresses which are optically similar to the received network address can be derived.

Another possibility instead of OCR is to create a database with characters that might look similar to a user. Such a solution can work faster, but is less general.

According to a further embodiment of the invention derivatives which are structurally similar to the received network address are generated by means of adding and/or removing and/or replacing prefixes, postfixes, punctuation marks and/ or other common network address elements.

Common prefixes are e.g. "my", or "e-", common postfixes are e.g. "online", "24" and common punctuation marks are e.g. dashes.

According to a further embodiment of the invention derivatives which are editorially similar to the received network address are generated by means of compensating for typing errors.

For this embodiment several known methods which perform compensating of common typing errors can be used. This is in particular efficient against phishing attacks that use URLs that differ from a trustworthy URL only by a common typing error.

According to a further embodiment of the invention derivatives are generated by means of changing the top level domain.

As more and more top level domains are created, the change of the top level domain is a promising target of phishing attacks. As an example, if a trusted website for the top level domains .de and .com exist, a phishing attack might be performed by using the top level domains .eu or org or any other top level domain that is not used by the owner of the trusted website.

According to a further embodiment of the invention the trust level assignment is based on at least a first property and a second property of the generated derivatives and the received network address.

This enhances the reliability of the method, as the trust level is not only dependent from one property of the network address.

According to a further embodiment of the invention the trust level is assigned by means of a combination of at least two of the following properties of the received network address and the derivatives:
the validity of the received network address and the derivatives,
the rank of the received network address and the derivatives,
the host location of the received network address and the derivatives,
the creation date of the received network address and the derivatives,
the character set of the received network address and the derivatives,
belonging to a whitelist with trusted network addresses and/ or
belonging to a blacklist with untrusted network addresses.

The rank or page rank, sometimes abbreviated to PR, is a family of algorithms for assigning numerical weightings to hyperlinked documents or web pages, indexed by a search engine (PageRank is a trademark of Google Inc.). In general, the higher the page rank, the higher the importance of the webpage, the more trustworthy will the webpage be considered and the higher the assigned trust level. The host location is another possible criteria for assigning a trust level. The more trustworthy the host location, the higher the assigned trust level. Another possible property for assigning a trust level is the creation date of the domain. In general, domains which are rather old, are considered to be relatively trustworthy, while recently created domains are considered to be relatively untrustworthy. This is based on the fact that fraudulent websites are often only provided for a short period of time. It should be noted that with the method according to this embodiment of the invention the creation date of the domain is only one out of at least two criteria. Hence, the assigned trust level of a newly created website can be relatively high if the other properties get a high rating. The character set of the domain is another possible property. As an example, character sets that are different from the native character set, could be given a different trust level. Another property could be if the network address belongs to a whitelist with trusted network addresses or a blacklist with untrusted network addresses.

According to a further embodiment of the invention a first weighing coefficient is assigned to the first property and a second weighing coefficient is assigned to the second property and wherein the trust level assignment is based on a weighed combination of the first and the second property by means of the first and the second weighing coefficient.

This further enhances the reliability of the method. The first and the second property and all other used properties can be given a different weighing coefficient and hence a different influence on the trust level. The weighing coefficients can be adjusted over time and adapted according to the experience with the relevance of the different properties.

According to a further embodiment of the invention the response is based on the difference between the trust level of the received network address and the trust level of the derivatives.

This further enhances the reliability of the method. It allows taking into account the individual situation of each case. The response is based on the relative trust level of the received network address, i.e. the trust level of the received network address is evaluated in relation to the trust level of the generated derivatives.

According to a further embodiment of the invention the response comprises the received network address or the content of the received network address respectively, if the difference between the trust level of the received network address and the trust level of the derivatives is greater than a predetermined threshold level or the response indicates that the received network address is untrustworthy, if the difference between the trust level of the received network address and the trust level of the derivatives is smaller than or equal to the predetermined threshold level.

This is a very efficient and reliable method. If the received network address is trustworthy, the trust level of the received network address will be relatively high compared to the trust level of the generated derivatives. In this case, the response would comprise the received network address or the content of the received network address, e.g. a requested webpage. If the received network address is not trustworthy, the trust level of the received network address will be relatively low compared to the trust level of the generated derivatives. In this case, the response would indicate that the received network address is untrustworthy. This can be done in several ways. One possibility would be to warn the user or the system administrator or the source of the evaluation request. Another possibility would be to suggest alternative network addresses that have a higher trust level. A further option would be to just block a received or requested network address or to issue automatically the network address which the user most likely intended to request.

According to a further embodiment of the invention the method is performed within a proxy server, within a browser or within a Domain Name System (DNS) server of a computer system.

If the method is performed within a proxy server, all user requests for a webpage will be evaluated. If the webpage is not trustworthy, the proxy server will issue an appropriate response, e.g. a warning message indicating a phishing attack. This is transparent for the user and can be centrally administered.

Implementing the method within the browser is in particular advantageous for individual users who want to enhance their system security and protect themselves against phishing attacks.

Implementing the method within a DNS server can protect users by checking for phishing or other attacks at the moment the domain request is performed. In case of a phishing attack, a message "domain non-existent" can be returned or the user can be redirected to a page that warns the user and/or suggests alternatives.

According to another aspect of the present invention, there is presented a computer program stored on a non-transitory computer medium and comprising instructions for carrying out the steps of the method described above when said computer program is executed on a computer system.

According to another aspect of the present invention, there is presented a computer system comprising a computer for carrying out the steps of the method described above.

According to another aspect of the present invention, there is presented a method for deploying computing infrastructure, comprising integrating computer readable code into a computer system, wherein the code in combination with the computer system is capable of performing the following:
  requesting a network address,
  generating derivatives of the requested network address,
  assigning a trust level to the generated derivatives and the requested network address,
  comparing the trust levels of the derivatives with the trust level of the requested network address and
  issuing a response based on the comparison.

This method allows to improve the security of computer systems in a reliable and efficient way. This method is particularly suited for service providers who offer information technology services.

According to another aspect of the present invention, there is presented a method for performing an analysis of the network communication traffic of a business entity, the method comprising the steps of:
  compiling a list of network addresses accessed by the business entity,
  generating derivatives of the accessed network addresses,
  assigning a trust level to the generated derivatives and the accessed network addresses,
  comparing the trust levels of the derivatives with the trust level of the accessed network addresses and
  compiling a list of accessed network addresses with low trustworthiness based on the comparison.

This method allows business entities or service providers to analyse security risks of business entities. Computer systems of business entities are more and more linked and interconnected with external networks, in particular with the Internet. This poses a serious threat on the data security. Doing an analysis of the network communication traffic with external networks such as the internet may reveal security risks and dangers. Once dangerous or untrustworthy network addresses have been detected, they can be put on a blacklist and the employees can be warned.

DESCRIPTION OF THE DRAWINGS

Preferred embodiments of the invention are described in detail below, by way of example only, with reference to the following schematic drawings.

The drawings are provided for illustrative purpose only and do not necessarily represent practical examples of the present invention to scale.

Figure 1:
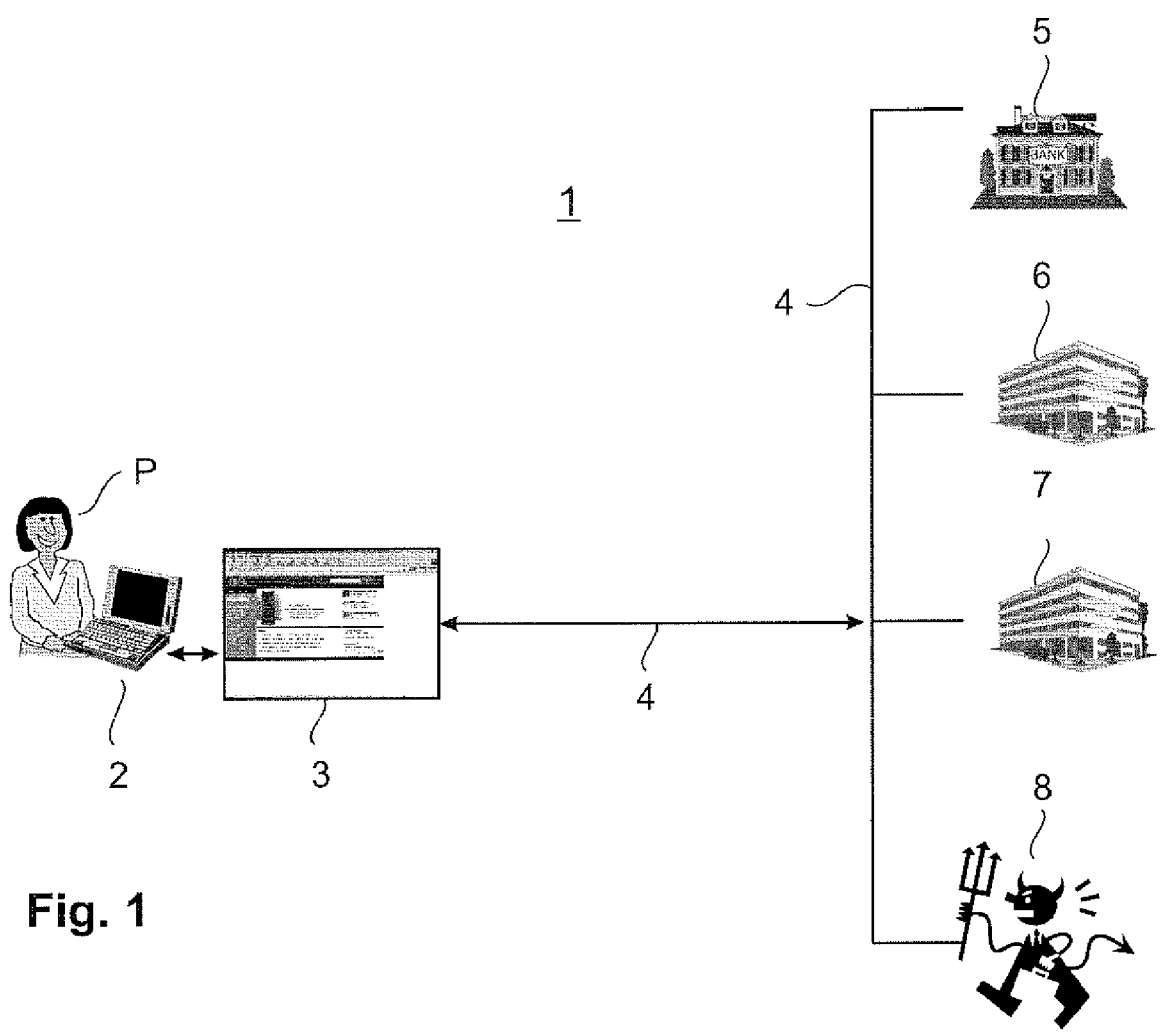
FIG. 1 shows a schematic illustration of a computer system according to an embodiment of the present invention.

With reference to FIG. 1, the general layout of a computer system 1 is described in which the invention can be used. In the figures, same reference signs are used to denote the same or like parts. FIG. 1 shows a person P, who uses a computer 2. The computer 2 executes as computer program a browser 3. The browser 3 comprises evaluation software that evaluates if requested network addresses are trustworthy. The evaluation software might be implemented as separate software tool as well. The computer 2 and the browser 3 are connectable for application-dependent interactions to a network 4. The network 4 can represent e.g. the Internet. The computer 2 can exchange information with other network users and data via the network 4 and by means of the browser 3. FIG. 1 shows as further network users a bank 5, a first business entity 6, a second business entity 7 and a malicious entity 8. The bank 5, the first business entity 6 and the second business entity 7 are trustworthy users of the network 4. The bank 5, the first business entity 6, the second business entity 7 and the malicious entity 8 have each an individual network or internet address, e.g. a URL. The person P has to enter this individual network address into his computer and can then communicate via the network 4 by means of the browser 3 with the respective network user.

Figure 2:
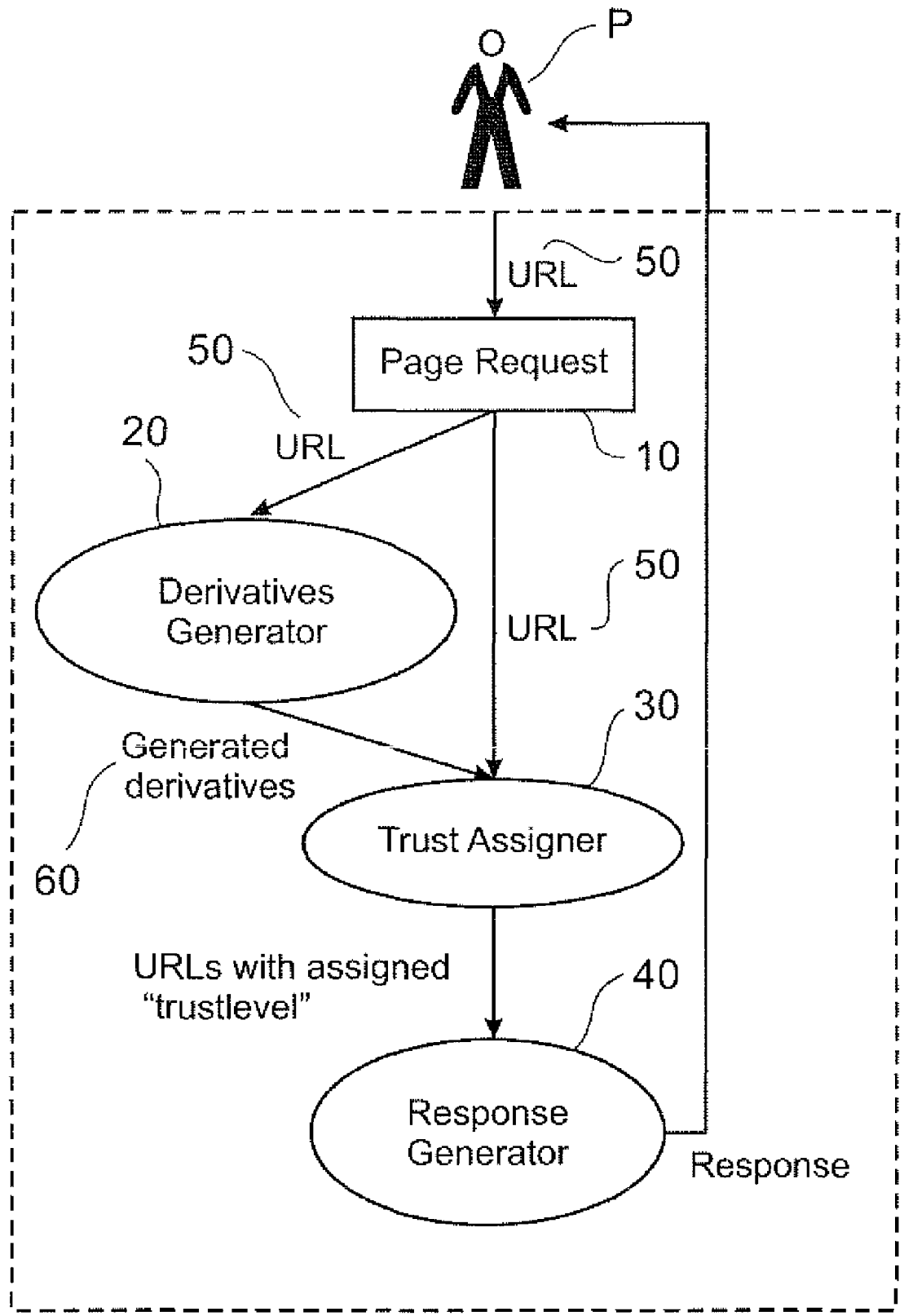
FIG. 2 shows a schematic illustration of a general flow chart of a method according to an embodiment of the present invention.

FIG. 2 shows a schematic illustration of a general flow chart of a method according to an embodiment of the invention. The method can be performed e.g. as software program that runs on the computer 2 of FIG. 1. In this general example it is assumed that the person P wants to request a specific webpage. In step 10 the person P enters as network address 50 the Uniform Resource Locator (URL) of this webpage into the browser 3 of the computer 2. The browser 3 starts the evaluation software which receives and evaluates the trustworthiness of the requested URL 50. The security software generates in step 20 derivatives 60 of the requested URL 50. The generated derivatives 60 are a set of network addresses, i.e. in this example a set of URLs, which are derived from the requested URL 50 and are similar to the requested URL 50. The similarity can be e.g. optical, editorial or structural. Several algorithms for deriving derivatives 60 can be combined. Each of them may target one or more form of similarity. Optical similar network addresses can be constructed by performing Optical Character Recognition (OCR) on the requested network address (URL) 50. Structural similar network addresses can be generated by adding and/or removing and/or replacing common pre- and postfixes, punctuation marks and/or other common network address elements. Editorial similar network addresses can be generated by means of compensating for common typing errors. In addition, derivatives 60 can be generated by means of changing the top level domain.

One goal of this step 20 is to create a set of derivatives 60 of which one is the network address which the user intended to request, in case this is not the requested network address itself.

In a following step 30 all the generated derivatives 60 as well as the requested network address 50 are checked for trustworthiness by means of a set of properties of the requested network address 50 and the generated derivatives 60. Then a trust level is assigned to the requested network address 50 and to the generated derivatives 60. The trust level assignment is preferably based on at least a first property and a second property of the generated derivatives 60 and the requested network address 50. Such properties could be the validity, the page rank, the host location, the creation date, and/or the character set of the requested network address 50 and the derivatives 60. As another property it could be checked if the requested network address 50 and the derivatives 60 belong to a whitelist with trusted network addresses and/or to a blacklist with untrusted network addresses. Preferably the properties of the network addresses 50 and the derivatives 60 are given different relevance by means of weighing coefficients. The trust level assignment is then based on a weighed combination of the used properties of the network addresses. As an example, if the requested network address 50 or one of the derivatives 60 belongs to a blacklist, this will have a very high impact on the trust level, i.e. the trust level will be generally zero. As another example, the creation date of the requested network address 50 or the derivatives 60 will have a relatively low weighing factor and hence have lower influence on the assigned trust level.

In a following step 40 the trust level of the derivatives 60 is compared with the trust level of the requested network address 50 and a response is issued based on this comparison. If the requested network address 50 is trustworthy, the trust level of the requested network address 50 will be relatively high compared to the trust level of the generated derivatives 60. In this case, the response could comprise the requested network address 50, i.e. the requested webpage. If the requested network address 50 is not trustworthy, the trust level of the requested network address 50 will be relatively low compared to the trust level of the generated derivatives 60. In this case, the response could indicate that the requested network address 50 is untrustworthy. This can be done in several ways. One possibility would be to warn the person P. Another possibility would be to suggest alternative network addresses that have a higher trust level. A further option would be to just block the requested network address 50 or to issue automatically the network address which the user most likely intended to request.

Figure 3:
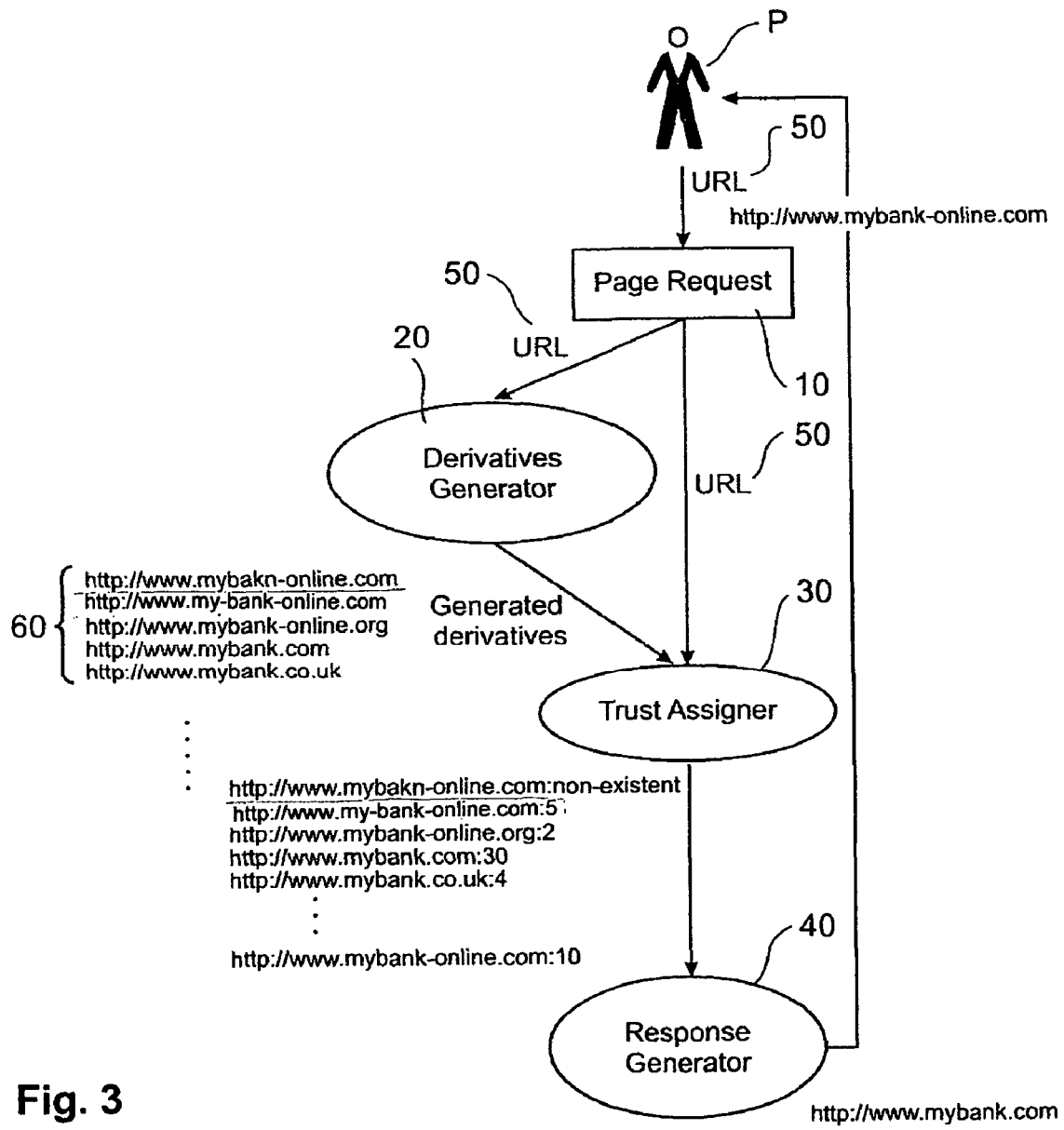
FIG. 3 shows a schematic illustration of a specific flow chart of a method according to an embodiment of the present invention.

FIG. 3 shows a schematic illustration of a specific flow chart of a method according to an embodiment of the invention. In this specific example it is assumed that the person P requests in step 10 as network address 50 the URL associated with mybank-online.com. This URL belongs to a fraudulent webpage of the malicious entity 8 of FIG. 1. By means of this fraudulent webpage the malicious entity 8 wants to get sensitive information, such as credit card information, account numbers, account names and passwords, from the person P. This means the malicious entity 8 wants to perform a so called phishing-attack.

In step 20, the evaluation software of the browser 3 generates a set of similar derivatives 60 comprising as an example of the URLs, http worldwide web (www) addresses of:
mybakn-online.com,
my-bank-online.com,
mybank-online.org,
mybank.com,
mybank.co.uk,
etc.

In step 30, different trust levels are assigned to the generated derivatives 60 and the requested network address (URL) 50:
mybakn-online.com: trust level 0 (non-existent)
my-bank-online.com: trust level 5
mybank-online.org: trust level 2
mybank.com: trust level 30
mybank.co.uk: trust level 4
mybank-online.com: trust level 10

In step 40, the trust level of the derivatives 60 is compared with the trust level of the requested network address 50. In this example, the trust level "10" of the requested URL mybank-online.com is relatively low compared to the trust level "30" of the generated derivative mybank.com.

In this case, the response is issued in the form of a suggestion. It is suggested to issue the URL mybank.com instead of the requested URL mybank-online.com.

Any disclosed embodiment may be combined with one or several of the other embodiments shown and/or described. This is also possible for one or more features of the embodiments.

The present invention can be realized in hardware, software, or a combination of hardware and software. Any kind of computer system—or other apparatus adapted for carrying out the method described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A method for a computer having at least one processing device for evaluating a network address, comprising the steps of the at least one processing device:
   receiving a network address;
   generating a plurality of derivatives of the received network address;
   assigning a trust level value to each of the generated derivatives and a trust level value to the received network address;

comparing the trust level values of each of the derivatives with the trust level value of the received network address; and issuing a response based on the comparison.

2. The method according to claim 1, wherein the received network address is an address of a webpage.

3. The method according to claim 1, wherein the received network address is a Uniform Resource Identifier (URI), in particular a Uniform Resource Locator (URL).

4. The method according to claim 1, wherein the derivatives are generated by means of at least two different methods.

5. The method according to claim 1, wherein derivatives which are optically similar to the received network address are generated by means of Optical Character Recognition (OCR).

6. The method according to claim 1, wherein derivatives which are structurally similar to the received network address are generated by at least one of adding and/or removing prefixes, postfixes, punctuation marks and/or other common network address elements.

7. The method according to claim 1, wherein derivatives which are editorially similar to the received network address are generated by means of compensating for typing errors.

8. The method according to claim 1, wherein derivatives are generated by means of changing a top level domain.

9. The method according to claim 1,
wherein the assigning a trust level value is based on at least a first property and a second property of the generated derivatives and the received network address.

10. The method according to claim 9, wherein a first weighing coefficient is assigned to the first property and a second weighing coefficient is assigned to the second property and wherein the trust level value assignment is based on a weighed combination of the first and the second property by means of the first and the second weighing coefficient.

11. The method according to claim 9, wherein the assigning a trust level value is assigned by means of a combination of at least two of the following properties of the received network address and the derivatives:
a validity of the received network address and the derivatives,
a rank of the received network address and the derivatives,
a host location of the received network address and the derivatives,
a creation date of the received network address and the derivatives,
a character set of the received network address and the derivatives,
belonging to a whitelist with trusted network addresses and/or
belonging to a blacklist with untrusted network addresses.

12. The method according to claim 1, wherein the response is based on a difference between the trust level value of the received network address and the trust level values of the derivatives.

13. The method according to claim 1, wherein the response comprises the received network address or content located at the received network address respectively, if a difference between the trust level value of the received network address and the trust level values of the derivatives is greater than a predetermined threshold level or the response indicates that the received network address is untrustworthy, if a relative difference between the trust level value of the received network address and the trust level values of the derivatives is smaller than or equal to a predetermined threshold level.

14. The method according to claim 1, wherein the method is performed within a proxy server, within a browser or within a Domain Name System (DNS)-server of a computer system.

15. The method of claim 1 further comprising requesting a network address.

16. A computer program stored on a non-transitory computer readable medium and comprising instructions for a computer to execute a method for evaluating a network address, the method comprising the steps of:
receiving a network address;
generating a plurality of derivatives of the received network address;
assigning a trust level value to each of the generated derivatives and a trust level value to the received network address;
comparing the trust level values of the derivatives with the trust level value of the received network address; and
issuing a response based on the comparison.

17. A computer system, having at least one processor for executing components, for evaluating a network address comprising:
a receiving component for receiving a network address; and
a processing component for generating a plurality of derivatives of the received network address, for assigning a trust level value to each of the generated derivatives and a trust level value to the received network address, for comparing the trust level values of the derivatives with the trust level value of the received network address and for issuing a response based on the comparison.

18. A method for deploying computing infrastructure, comprising integrating computer readable code into a computer system, wherein the code in combination with the computer system is capable of performing the following:
requesting a network address;
generating a plurality of derivatives of the requested network address;
assigning a trust level value to each of the generated derivatives and a trust level value to the generated derivatives and the requested network address;
comparing the trust level values of the derivatives with the trust level value of the requested network address; and
issuing a response based on the comparison.

19. A method for performing an analysis of the network communication traffic of a business entity, the method comprising the steps of:
compiling a list of network addresses accessed by the business entity;
generating a plurality of derivatives of the accessed network addresses;
assigning a trust level value to each of the generated derivatives and a trust level value to the generated derivatives and the accessed network addresses;
comparing the trust level values of the derivatives with the trust level value of the accessed network addresses; and
compiling a list of accessed network addresses with low trustworthiness based on the comparison.

* * * * *